Oct. 17, 1961   G. A. TINNERMAN   3,004,370
RETAINING CLIPS
Original Filed Nov. 7, 1956

INVENTOR
GEORGE A. TINNERMAN
BY Featherstonhaugh & Co.
ATTORNEYS

United States Patent Office 3,004,370
Patented Oct. 17, 1961

3,004,370
RETAINING CLIPS
George A. Tinnerman, 17864 Beach Road,
Lakewood, Ohio
Original application Nov. 7, 1956, Ser. No. 620,936, now Patent No. 2,923,385, dated Feb. 2, 1960. Divided and this application Feb. 16, 1959, Ser. No. 793,539
2 Claims. (Cl. 50—520)

This invention relates to retaining clips, particularly clips for retaining rods or bars in secured relation to one another, and this application is a division of United States application Serial No. 620,936 filed November 7, 1956, now Patent No. 2,923,385.

In the securement of reinforcing rods for concrete and the like wherein the rods are disposed substantially at right angles to one another, many forms of securement have been proposed including wire clips and the like. In order to effect proper securement, it is necessary to adjust the fasteners carefully which requires precise application and in many cases the rods will not be held as securely as may be desired. Again, as a further example, iron fences involving bars and/or rods disposed in angular relation to one another have entailed complication in securement usually requiring skilled labor and a great deal of time in erection. The present invention in its several applications provides a retainer which may be fastened securely by driving it in very conventional manner and which will function to hold the parts very securely together avoiding the work and care necessary with other means of securement.

The invention generally comprises a retaining clip of sheet metal bent upon itself to form a body having spaced apart walls defining therebetween a receiving channel, the walls of the channel being recessed to form pairs of spaced apart jaws providing therebetween a second receiving channel at an angle to the first and having gripping means for gripping one element of two designed to be secured in angular relation to one another, said gripping means tending to bite into one element to lock said retainer thereto, said other element being straddled by the walls of the retainer to locate it securely in relation to the other element, the span between the jaws at least at one point being less than the width of the element straddled thereby and to engage the latter in secured pressure engagement. In some cases, the walls of the retainer may be formed with tongues struck therefrom to contact the element straddled thereby in biting engagement.

The invention will be clearly understood by reference to the following detailed specification taken in conjunction with the accompanying drawings.

Figure 1:
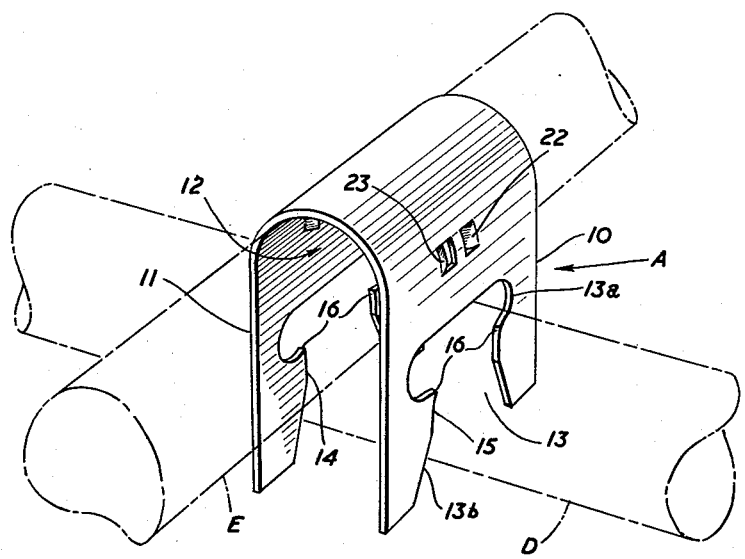
FIG. 1 is a perspective view of the retainer as applied to the securement of rods in angularly disposed relation to one another, the rods being illustrated fragmentarily in dotted lines.

Referring to the drawings, A indicates a retainer according to the present invention formed from a sheet metal body bent upon itself to form side walls 10 and 11 spaced apart from one another to provide therebetween the receiving channel 12 designed to receive one rod of the two designed to be secured in angular relation to one another. The walls 10 and 11 are each recessed as at 13 in registry with one another to form the receiving recess for the second rod to be secured. The recess 13 in effect forms in each wall 10 and 11 the spaced apart jaws 14 and 15 respectively, the inner edges of which are designed to firmly engage and in effect bite into the rod with which they engage.

The retainer may be formed from sheet steel such as low carbon or high carbon heat treated steel but is preferably formed from steel having somewhat resilient characteristics. The jaws 14 and 15 are preferably provided with a projecting tooth 16 so as to provide a pair of opposed teeth as between each pair of jaws. Preferably these teeth are outwardly flared slightly from the plane of the side walls from which the jaws are formed. The teeth are designed to have at least a biting action into the surface of the bar which they engage when forced home to unite an assembly, and the outward flaring thereof has the tendency to cause each pair of jaws to flex inwardly towards the other pair rather than possibly to flex away from one another. Accordingly this action tends to force each pair of jaws into firm engagement with the element which is received in the channel 12 straddled by the pairs of jaws 14 and 15.

A degree of resilience is imparted to the jaws by laterally extending the recess 13 as at 13a. Moreover, it should be noted that the entrance to the recess 13 is substantially flared outwardly towards the free edges of the walls 10 and 11 as indicated at 13b which forms a guiding means for causing the jaws of the retainer accurately to straddle the element D when such retainer is driven into securing position.

The retainer A is readily adaptable for use in securing angularly disposed reinforcing rods D and E for concrete or the like in which instance the retainer is positioned so that the jaws 14 and 15 thereof straddle the rod E and the recessed portion 13 is disposed in registry with the rod D at right angles to rod E. Consequently, when the retainer A is then driven by percussive action in a direction towards the rod D, the retainer will be caused to secure the rods firmly together in angular relation, in which instance the jaws 14 and 15 are caused to straddle rod D in a tight biting grip wherein the teeth tend to bite into the engaged surfaces to rod D. The outwardly flared teeth 16 have the effect of preventing outward spreading of the walls 10 and 11 as to assure that a tight biting grip is achieved. Moreover, these walls are each provided with a pair of tongues or lugs 22 and 23 struck inwardly therefrom and extend into the channel 12 at opposed angles to one another and at an incline to the plane of said walls and which provide biting edges 24 disposed substantially parallel to the plane of said walls and substantially parallel to the side edges of said walls and which engage the rod E as the retainer is driven home. The biting edges of the lugs therefore extend substantially at right angles to the longitudinal axis of the rod E into which they may, threfore, readily bite and function to prevent movement of the retainer A in the axial direction of rod E whereas the teeth 16 of jaws 14 and 15 which are in biting engagement with the rod not only secure rod D to rod E but also have the effect of preventing movement of the retainer and consequently rod E held within its channel 12 against movement in the axial direction of rod D.

Figure 3:
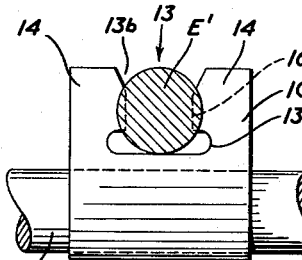
FIG. 3 is a miniature fragmentary view partly in section showing the retainer suspending a rod from another.
Figure 2:
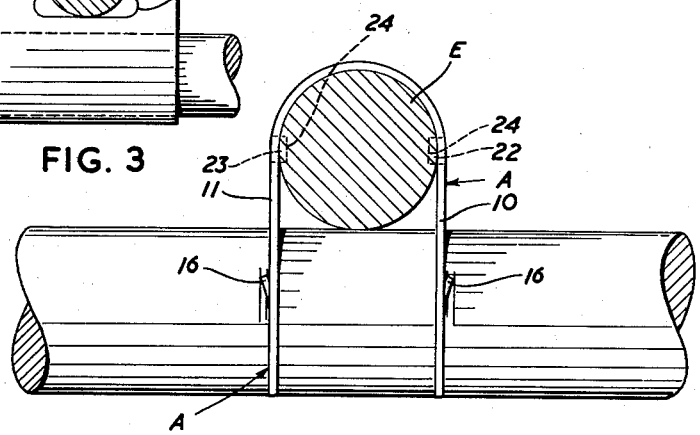
FIG. 2 is an end elevation of the retainer shown in FIG. 1 in relation to said angularly disposed rods which are shown fragmentarily and in section.

While in the construction described a retainer is adapted to hold two elements in angularly disposed contacting relation, it will be clear that it will equally function for retaining such elements in relative angular relation without necessarily maintaining them in contact. For instance, as shown in FIG. 3, the walls 10 and 11 may be formed longer than that normally required to encompass two bars such as D and E (FIGS. 1 and 2) so that the retainer may have the effect of suspending rod D1 relatively to rod E1.

The retainer is of very simple construction as is clear from the foregoing and, moreover, is very easy to employ since it is only necessary for the user to dispose the retainer so that its walls will preliminarily straddle one element with the recess 13 in registry with the other element and the parts become automatically locked in their angular relationship merely by driving the retained into final position. Thus, the retainer avoids time and effort of greater degree often required finally to fasten other forms of retaining elements which have previously been employed for similar purposes. Of course, having regard to the size and character of the elements which it is desired to secure, the retainer of the present invention will be proportioned to meet the necessary requirements, i.e. the width of the channel 12 will be set to accommodate the particular size of the element with which it cooperates whereas the span of the recess 13 will accordingly be wider or narrower according to requirements. Moreover, it is of course obvious that the retainer may be made of any material suitable to its purpose.

While in the foregoing I have disclosed preferred forms of construction, it will be appreciated that the retainer may be modified to some extent within the principle thereof. Accordingly, it is intended that the foregoing should be interpreted in an illustrative sense rather than a restrictive sense and not subject to limitation other than the general limits set forth in the appended claims.

What I claim as my invention is:

1. A retainer for securing a bar and element in angularly disposed relation to one another comprising a hardened, resilient sheet metal body bent upon itself to form spaced apart opposed walls having free end extremities opposite to its bent portion and defining a channel therebetween open at said free extremities, said walls each being recessed inwardly from said free extremities in registry with one another to form pairs of spaced apart jaws, said channel forming receiving means for said bar and said walls having means projecting inwardly of said channel engageable with said bar to grip the latter and biased against axial movement of said bar in said channel, said recesses forming receiving means for said element, said bent portion of said body forming a striking head, for driving said body into engaged position with said bar and said element, by percussive contact, said inwardly projecting means and said jaws being capable of simultaneously gripping said bar and said element respectively in biting pressure engagement when the former is received in said channel, the latter is straddled by said jaws and said body is driven into engaged position, said jaws having teeth outwardly flared from the plane of their respective walls as to bite into the element at an incline to its longitudinal axis as said body is driven to engaged position whereby to cause said jaws to engage said element in firm biting engagement.

2. A retainer as claimed in claim 1 in which said inwardly projecting means takes the form of at least a pair of spring pressure lugs struck from each wall, the lugs of each pair extending at an opposed incline to one another and at an incline to the plane of their walls, each lug terminating in a biting edge disposed substantially parallel to the plane of said walls and parallel to the side edges of said walls whereby said lugs are caused to engage said bar at right angles to its longitudinal axis and cut into said bar in biting engagement when said body is driven into engaged position thereby to retain said bar against axial displacement.

References Cited in the file of this patent

UNITED STATES PATENTS

| | | |
|---|---|---|
| 540,693 | Seely | June 11, 1895 |
| 910,399 | Lidseen | Jan. 19, 1909 |
| 1,029,612 | Johnson | June 18, 1912 |
| 1,939,223 | Palmer | Dec. 12, 1933 |
| 1,986,528 | Ranger | Jan. 1, 1935 |
| 2,923,385 | Tinnerman | Feb. 2, 1960 |

FOREIGN PATENTS

| | | |
|---|---|---|
| 898,803 | France | July 17, 1944 |